US012681913B2

(12) United States Patent
Singhal

(10) Patent No.: US 12,681,913 B2
(45) Date of Patent: Jul. 14, 2026

(54) DYNAMIC INTERNAL SERVICE/FUNCTION DISCOVERY IN TELECOM CLOUD ARCHITECTURE

(71) Applicant: Parallel Wireless, Inc., Nashua, NH (US)

(72) Inventor: Mukesh Singhal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/146,358

(22) Filed: Dec. 23, 2022

(65) Prior Publication Data

US 2023/0205752 A1 Jun. 29, 2023

Related U.S. Application Data

(60) Provisional application No. 63/293,277, filed on Dec. 23, 2021.

(51) Int. Cl.
*G06F 16/23* (2019.01)
*G06F 9/48* (2006.01)

(52) U.S. Cl.
CPC ............ *G06F 16/23* (2019.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 11,245,748 B1 * | 2/2022 | Hannon | .................. | H04L 67/56 |
| 11,457,080 B1 * | 9/2022 | Meduri | .................. | H04L 67/60 |
| 11,477,165 B1 * | 10/2022 | McDowall | .............. | H04L 63/02 |
| 2016/0269926 A1 * | 9/2016 | Sundaram | ........... | H04L 41/5054 |
| 2019/0166506 A1 * | 5/2019 | Ashrafi | ................ | H04B 1/0003 |
| 2020/0260427 A1 | 8/2020 | Schefczik et al. | | |
| 2020/0351650 A1 * | 11/2020 | Maria | ................. | G06F 9/45558 |
| 2021/0152554 A1 * | 5/2021 | Taft | .................... | H04L 41/0895 |
| 2021/0271489 A1 * | 9/2021 | Singhal | .................... | G06F 8/63 |
| 2021/0311764 A1 * | 10/2021 | Rosoff | ............... | G06F 9/44505 |
| 2022/0129284 A1 * | 4/2022 | Zhou | ......................... | G06F 8/71 |
| 2022/0400424 A1 | 12/2022 | Ghadge et al. | | |

(Continued)

FOREIGN PATENT DOCUMENTS

| | | | | |
|---|---|---|---|---|
| CN | 113726638 A | * | 11/2021 | ............. H04L 67/56 |

OTHER PUBLICATIONS

Pusztai T, Rossi F, Dustdar S. Pogonip: Scheduling asynchronous applications on the edge. In2021 IEEE 14th International Conference on Cloud Computing (CLOUD) Sep. 5, 2021 (pp. 660-670). IEEE. (Year: 2021).*

(Continued)

*Primary Examiner* — Uyen T Le
(74) *Attorney, Agent, or Firm* — Michael Y. Saji; Ashish Patel

(57) ABSTRACT

A method is disclosed for task and container pod startup and registry in a telecommunications core network, the method comprising: in a telecommunications core network microservices architecture, registering a credential for a container and task in a database as a microservice pod comes up; retrieving container information updated in the database once information for the microservice pod is updated; and sending a message to a controller task to register the microservice pod with the database.

16 Claims, 6 Drawing Sheets

(56) References Cited

U.S. PATENT DOCUMENTS

| | | | |
|---|---|---|---|
| 2023/0063162 A1 | 3/2023 | Singhal et al. | |
| 2023/0075944 A1 | 3/2023 | Desai et al. | |
| 2023/0142986 A1 | 5/2023 | Singhal et al. | |
| 2023/0199524 A1 | 6/2023 | Singhal | |
| 2023/0217341 A1 | 7/2023 | Singhal et al. | |
| 2025/0016711 A1* | 1/2025 | Tiwari | H04W 12/106 |

OTHER PUBLICATIONS

Koziolek, Heiko, et al. "Dynamic updates of virtual PLCs deployed as kubernetes microservices." European Conference on Software Architecture. Cham: Springer International Publishing, 2021. (Year: 2021).*

Weber, Ingo, et al. "Discovering and visualizing operations processes with pod-discovery and pod-viz." 2015 45th Annual IEEE/IFIP International Conference on Dependable Systems and Networks. IEEE, 2015. (Year: 2015).*

* cited by examiner

300

Service registry

Database

Worker backend pods

Group of backend pods to serve micro-service ( 1-N)

Internal Controller

Multiple-micro-service + front-end pods

Brain

Set of micro-services

DYNAMIC INTERNAL SERVICE/FUNCTION DISCOVERY IN TELECOM CLOUD ARCHITECTURE

CROSS-REFERENCE TO RELATED APPLICATIONS

This application claims priority under 35 U.S.C. § 119(e) to U.S. Provisional Pat. App. No. 63/293,277, filed Dec. 23, 2021, titled "Internal Service/Function Discovery," which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. This document also hereby incorporates by reference U.S. Provisional Pat. App. No. 63/124,293, filed Dec. 11, 2020, titled "Continuously Evolving Network Infrastructure with Real-Time Intelligence," in its entirety.

BACKGROUND

In complex services/product model where "N" number of microservices and "M" number pods together provides single solution. In such cases, quick learning & adjust to any change in deployment is needed.

SUMMARY

This disclosure proposes a mechanism for identifying pods and function within deployment cluster which would help in establishing communication channel internally between pods of different microservices and adjust to any change dynamically in few milliseconds.

In a first embodiment, a method is disclosed for task and container pod startup and registry in a telecommunications core network, the method comprising: in a telecommunications core network microservices architecture, registering a credential for a container and task in a database as a microservice pod comes up; retrieving container information updated in the database once information for the microservice pod is updated; and sending a message to a controller task to register the microservice pod with the database.

In a second embodiment, a method is disclosed for task and container registration and announcement in a telecommunications core network, the method comprising: resolving a database microservice using a fully qualified domain name (FQDN); updating the database microservice with a state of a first pod and with relevant information of the first pod in the database; retrieving the relevant information of the first pod and services from central database by a newly arrived pod; and start a periodic heartbeat with a controller.

DETAILED DESCRIPTION

In Cloud distributed architecture, pod & services life is transient. IP address of pods for internal communication are dynamically allocated at pod bring up. Number of pods vary based on load conditions in network. pods and service bring up sequence is dependent on of orchestrator and cloud resources. There is lot of dynamism in cloud deployments.

A product/service may be made up of multiple distinct microservices, pods and multiple interfaces to outside world. All the pods and micro services combined together provides some network function to outside world. It is desirable to identify set of pods and microservices available in given deployment dynamically.

Multiple services and worker pods stitched together to provide common function, may not be known to cloud providers. Load balancer microservices available today are very limited to few protocols only. Not all protocol are stateless, hence dynamic changes in internal environment are desired to be discovered and advertised in a matter of few milliseconds.

It is desirable to know if any changes like new Pod's creation and deletion or services added in our network function dynamically in matter of few milliseconds. Based on dynamic learning, our solution can adjust to new information and start making required changes in system seamlessly.

In the present disclosure, a pod is a group of one or more containers, which may have shared storage and network resources, and which may also have a specification for how to run the containers. A pod's contents may be co-located and co-scheduled, and run in a shared context. A pod may be an application-specific logical host, or may be non-application specific. In some embodiments, applications may be executed on different or the same physical or virtual machine. In some embodiments, applications may be cloud applications executed on the same logical host, or executed at a different location. Where pods and/or containers are described herein, various alternatives are also considered, such as Linux containers, Kubernetes containers, Microsoft Azure, or other cloud-based software technologies.

Figure 1:
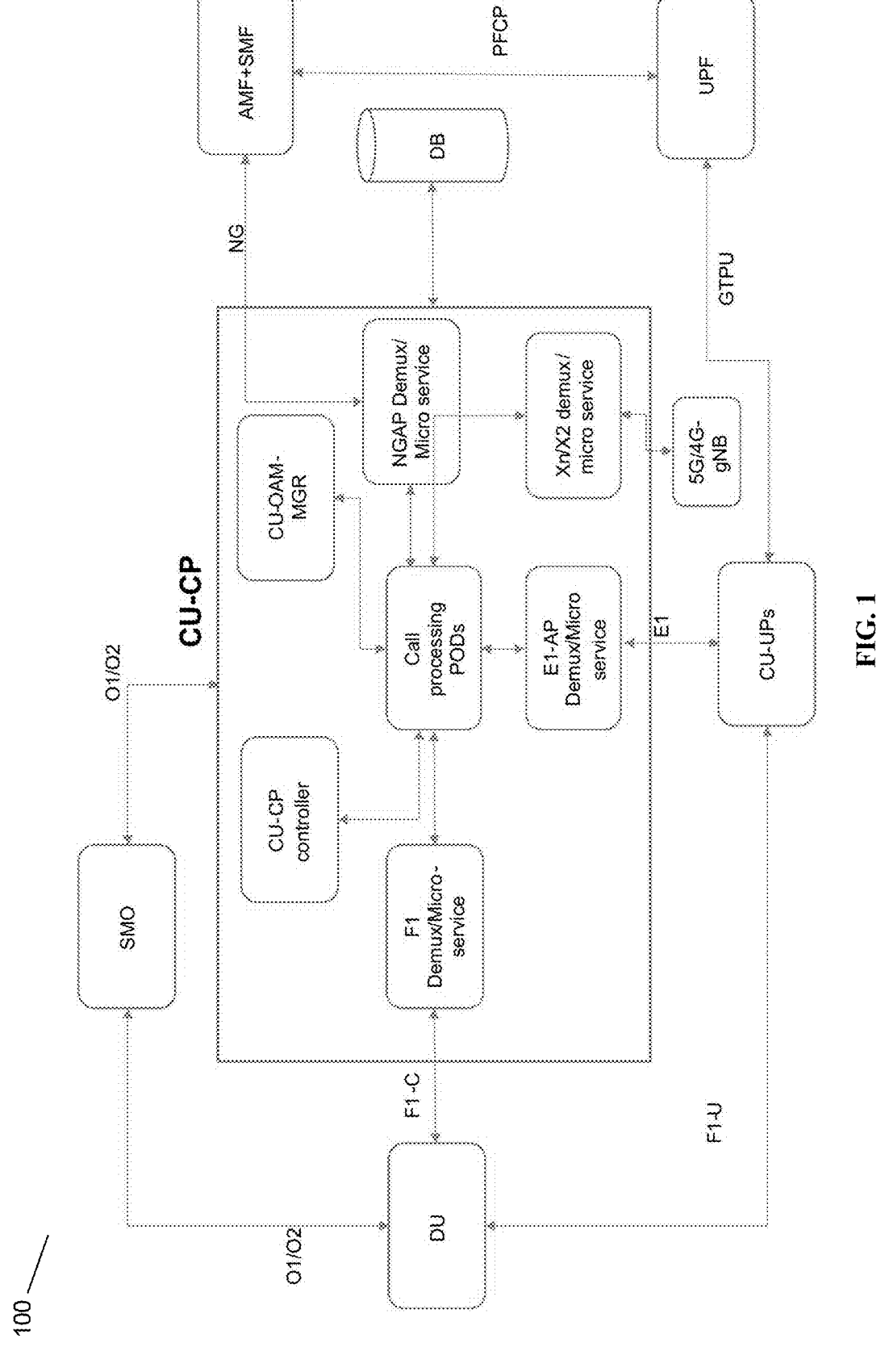
FIG. 1 is a schematic diagram showing a CU-CP internal logical architecture, in accordance with some embodiments.

FIG. 1 is a schematic diagram showing a CU-CP internal logical architecture, in accordance with some embodiments. Single CU (similarly CU-UP/CU-CP/AMF/SMF/UPF) or any other product may often have multiple pods and microservice in deployment scenario. There are multiple interfaces with outside world and each interface is independent protocol function as well as dependent of each other.

The depicted logical architecture shows multiple microservices and multiple types of pod combined together forming a single product deployment. Each inbound interface is handled by a microservice, for example, the E1 interface with CU-UP is handled by a E1-AP demux/microservice, and the NG interface with AMF+SMF is handled by an NGAP demux/microservice, and so on. Microservices being brought up and taken down in this way are able to handle demands flexibly and quickly, and react in a matter of milliseconds. The microservices shown are located inside the logical boundary of the CU-CP.

Figure 2:
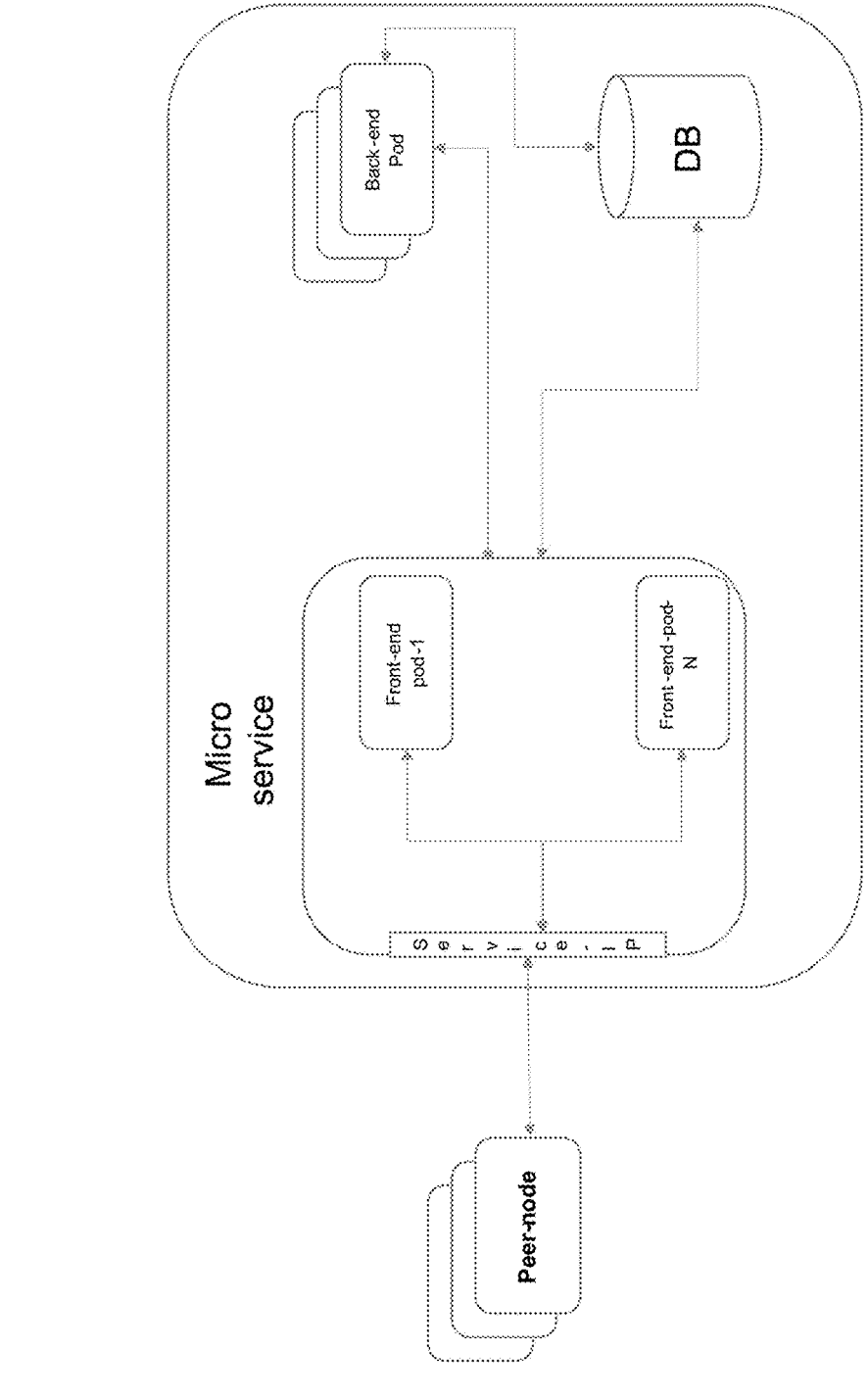
FIG. 2 is a schematic diagram showing a CU-CP microservice logical architecture with front and back-end pods, in accordance with some embodiments.

FIG. 2 is a schematic diagram showing a CU-CP microservice logical architecture with front and back-end pods, in accordance with some embodiments. A plurality of front-end pods for terminating connections and back-end pods for handling and processing traffic is in communication with a database; the database handles registration of the pods as described below. Other nodes, such as peer nodes, interface with the microservice via a particular service IP, and routing is performed within the microservice to the front end pods and back end pods, in some embodiments by a routing pod.

Figure 3:
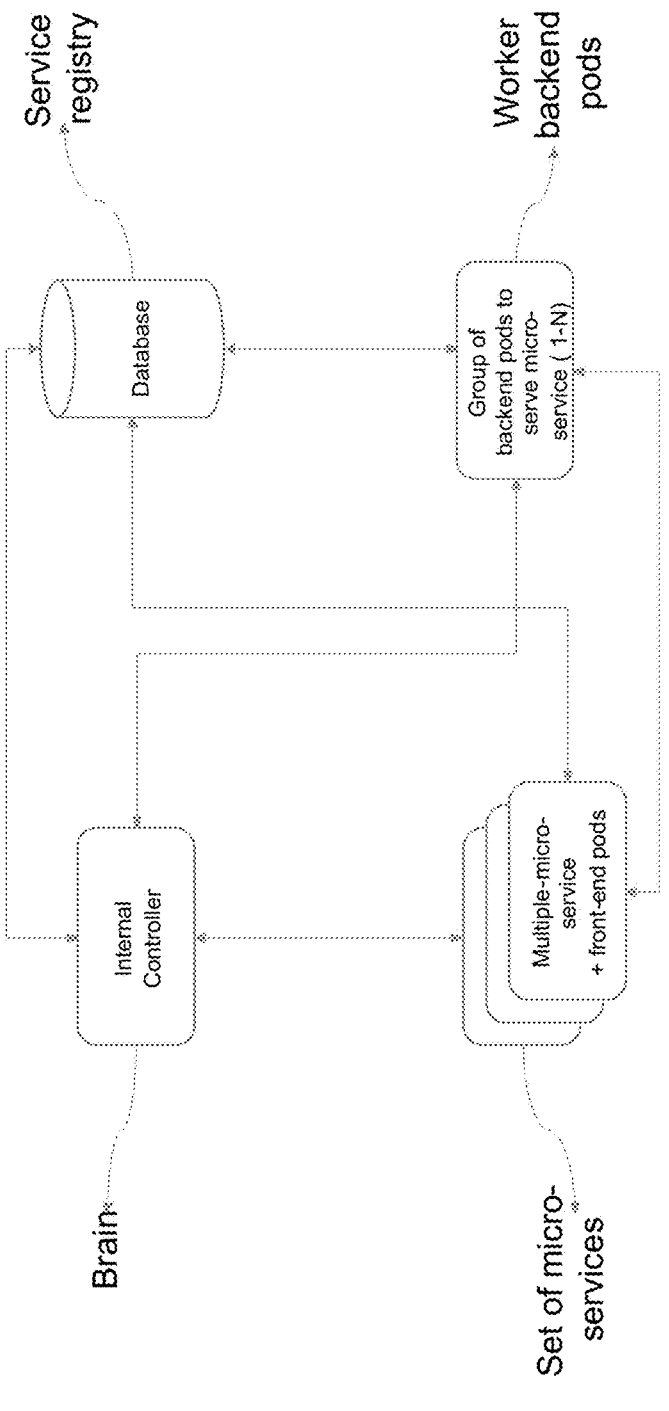
FIG. 3 is a schematic diagram showing a CU-CP microservice internal discovery logical architecture, in accordance with some embodiments.

FIG. 3 is a schematic diagram showing a CU-CP microservice internal discovery logical architecture, in accordance with some embodiments. Within a single microservice, the database hosts a service registry, while a controller performs service distribution. Multiple front-end microservice pods serve to terminate the front end protocols and communicate with other microservices/pods, and a group of backend pods to service these microservices serves as a set of worker backend pods.

In Operation

Task/container/pod startup & Registry. As soon as container/task in pod comes up, It may register its credential like {namespace, microservice name, application-name, pod-name, IP-address, port, status, function-name, label, etc. . . . } in database. If Database service is not up, Container running on pods will keep trying till it succeed.

Without updating information in database, Network function will not come up as internal task/pods are unaware of other microservices in deployment.

Task/container Internal Service discovery. Once pod/container information is updated in database, it would fetch information all the container information updated in database. In some embodiments the database may be a distributed database. In some embodiments the container information may update periodically, such as at one or more of system start, system reconfiguration, fixed or variable periodicity, and manual push.

Task/container Announcement may be performed as follows. Once it learns information required, Container/Task in given pod can send messages to Controller-Task and all other task to register itself. Newly created container/pod will start heart-beat messaging with Controller-task periodically.

Task/container Death notification may be performed as follows. Control task would identify if heartbeat not received from configurable times from some active pod/container/tasks. it would declare specific pod/container/task as dead and update the status of pod/container/task in register and advertise internally to all the required pods in given deployment/namespace.

In some embodiments, Steps for registration/announcement are as follows. Each Container/Task comes up with configured microservice name or IP of central database. Resolve database microservice using FQDN; update the database with new container/task state and relevant information in database; newly arrived pod will fetch information of the container/task/pods and services from central database whatever records available; the newly arrived pod may announce/register itself with other container/pods in system based on flow; and the newly arrived pod may start periodic heartbeat with controller.

Figure 4:
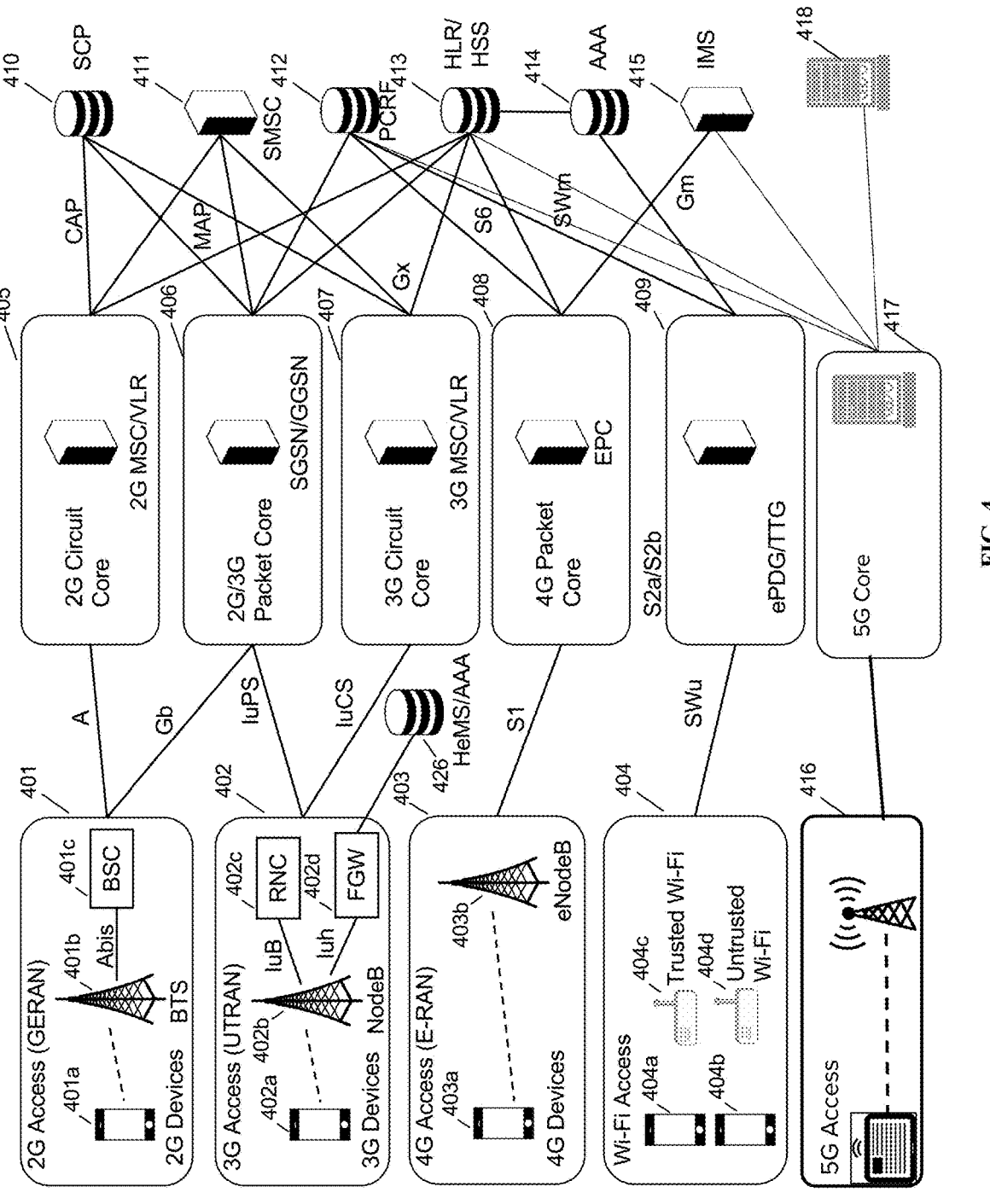
FIG. 4 is a schematic network architecture diagram for 3G and other-G prior art networks.

FIG. 4 is a schematic network architecture diagram for 3G and other-G prior art networks. The diagram shows a plurality of "Gs," including 2G, 3G, 4G, 5G and Wi-Fi. 2G is represented by GERAN 401, which includes a 2G device 401a, BTS 401b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 2G circuit core network 405 includes a 2G MSC/VLR; 2G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 5:
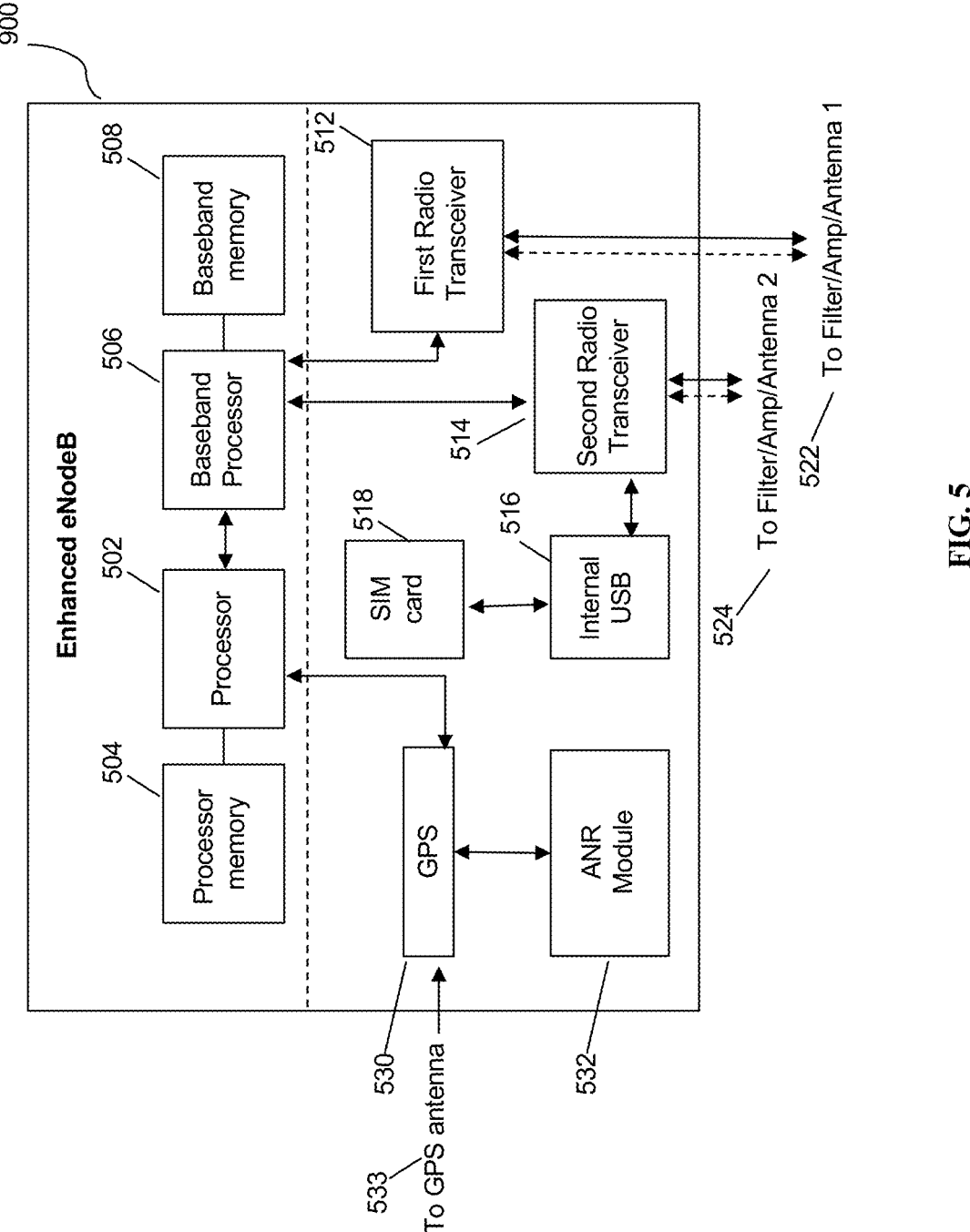
FIG. 5 is an enhanced eNodeB for performing the methods described herein, in accordance with some embodiments.

FIG. 5 is an enhanced eNodeB for performing the methods described herein, in accordance with some embodiments. eNodeB 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
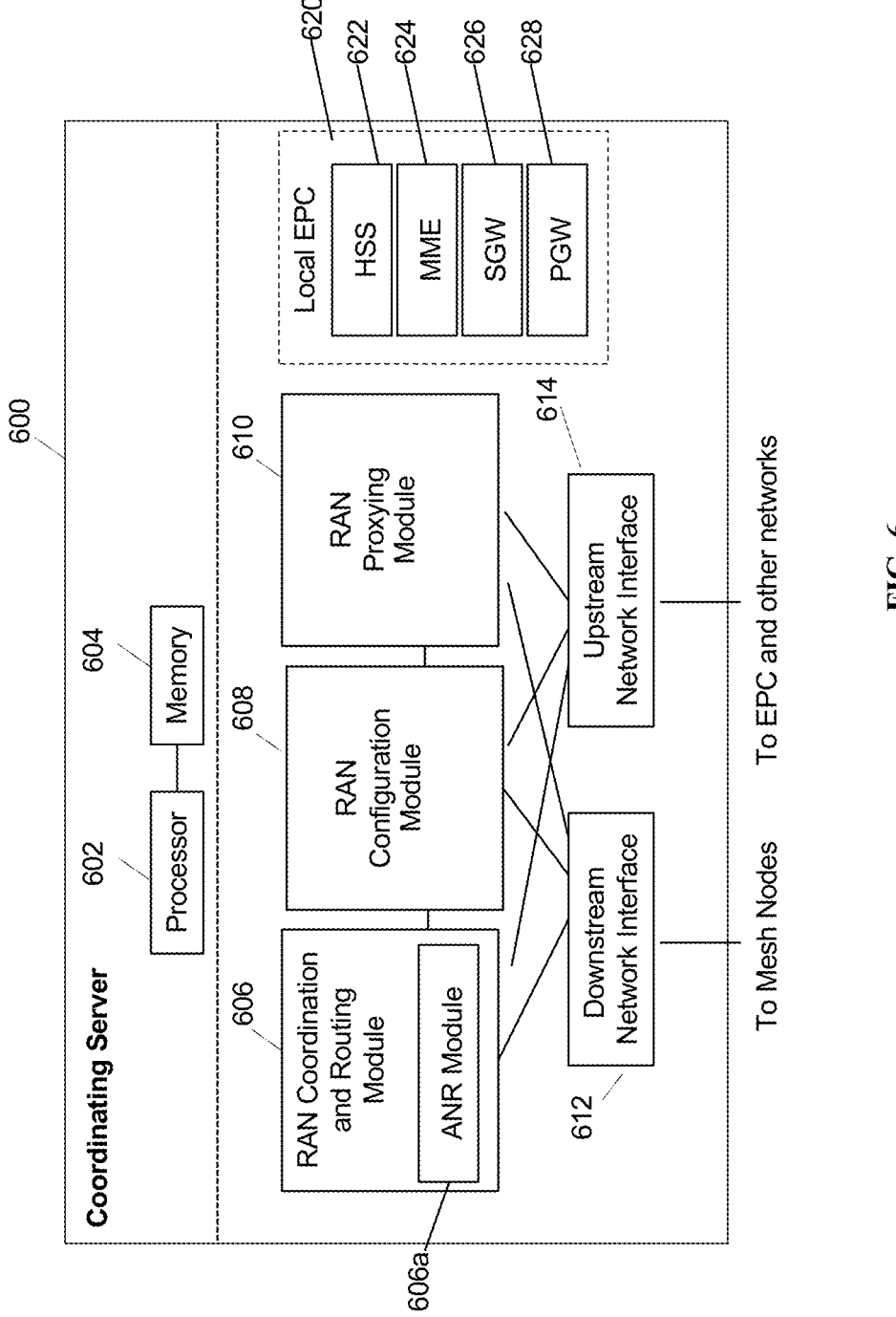
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

For simplicity reason, we are referring to a single process/task/container in any pods in this disclosure, but multiple processes/tasks/container per pod could be used as well with nominal changes to the present disclosure. In some embodiments, the controller may be colocated at the same physical location as the containers. In some embodiments, the controller may use Kubernetes cloud orchestration, Docker swarm, or equivalent. Provisioning, deployment, scaling (up and down), networking, load balancing, and/or other functions may be provided by the controller. One or more controllers may be used. In some embodiments, orchestration may occur across multiple clouds, including public, private, and on-prem clouds.

In the present disclosure, although a CU-CP is disclosed, the same microservice architecture can be used for implementing other network infrastructure nodes, such as, for example, a CU-UP, an AMF, an SMF, a UPF, an EPC MME, etc. or any other node in a telecommunications core network or in a cloud portion of a telecommunications radio network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of internal discovery in a telecommunications core network, the method comprising:

at a telecommunications core network machine having a microservices architecture, registering a credential for a container and task in a database as a microservice pod comes up;

retrieving container information updated in the database once information for the microservice pod is updated;

sending a message, by at least one of a task, container, or pod for the microservice, to a controller to register the microservice; and handling multiple externally-facing interfaces, each managed by a specific microservice, allowing for flexible reactions to demands;

wherein microservices tracked by the database are within a centralized unit control plane (CU-CP) logical boundary of a telecommunications network.

2. The method of claim 1, wherein the machine is a virtual machine.

3. The method of claim 1, wherein the telecommunications core network uses one of Kubernetes or Docker Swarm for at least two of provisioning, deployment, scaling, networking, and load balancing.

4. The method of claim 1, wherein the at least one of a task, container, or pod starts periodic heartbeat messaging with the controller to maintain synchronization and detect failures.

5. The method of claim 1, further comprising periodically updating container information throughout collocated containers, ensuring that collocated pods are aware of a current network state.

6. The method of claim 1, further comprising sending a message, by the at least one of a task, container or pod, to at least one of another task, another container, or another pod to register the microservice.

7. The method of claim 6, further comprising sending periodic heartbeat messages, by the at least one of a task, container or pod, to the controller to maintain synchronization and detect failures.

8. The method of claim 7, further comprising determining, by the controller, that at least one of the periodic heartbeat messages is not received from the at least one of a task, container or pod.

9. The method of claim 8, further comprising:

advertising, by the controller, that the at least one of a task, container or pod is dead to at least one of another task, another container, or another pod; and updating the database, by the controller, that the at least one of a task, container or pod is dead.

10. A method of internal discovery in a telecommunications core network, the method comprising:

resolving, at a telecommunications core network machine, a microservice using a fully qualified domain name (FQDN);

updating a state of a first pod for the microservice and information of the first pod in a database;

retrieving the information of the first pod and services of the first pod from the database by a newly arrived pod;

sending a message, by the newly arrived pod, to at least one of a task, container, or another pod to register the newly arrived pod; and handling multiple externally-facing interfaces, each managed by a specific microservice, allowing for flexible reactions to demands;

wherein microservices tracked by the database are within a centralized unit control plane (CU-CP) logical boundary of a telecommunications network.

11. The method of claim 10, further comprising periodically updating container information throughout collocated containers, ensuring that collocated pods are aware of a current network state.

12. The method of claim 10, further comprising, within a single microservice, hosting a database service registry and a service distribution controller.

13. The method of claim 10, wherein newly created containers or pods start periodic heartbeat messaging with a controller of the telecommunications core network to maintain synchronization and detect failures.

14. The method of claim 10, wherein the telecommunications core network uses one of Kubernetes or Docker Swarm for at least two of provisioning, deployment, scaling, networking, and load balancing.

15. The method of claim 10, further comprising starting periodic heartbeat messaging with a controller of the telecommunications core network by the newly arrived pod.

16. A non-transitory computer-readable medium comprising instructions for internal discovery in a telecommunications core network which, when executed, cause a system to perform steps comprising:

at a telecommunications core network machine having a microservices architecture, registering a credential for a container and task in a database as a microservice pod comes up;

retrieving container information updated in the database once information for the microservice pod is updated; and sending a message, by at least one of a task, container, or pod for the microservice, to a controller to register the microservice; and handling multiple externally-facing interfaces, each managed by a specific microservice, allowing for flexible reactions to demands;

wherein microservices tracked by the database are within a centralized unit control plane (CU-CP) logical boundary of a telecommunications network.

* * * * *